G. B. YOUNGS.
BRAKE.
APPLICATION FILED MAY 11, 1920.
1,424,059. Patented July 25, 1922.
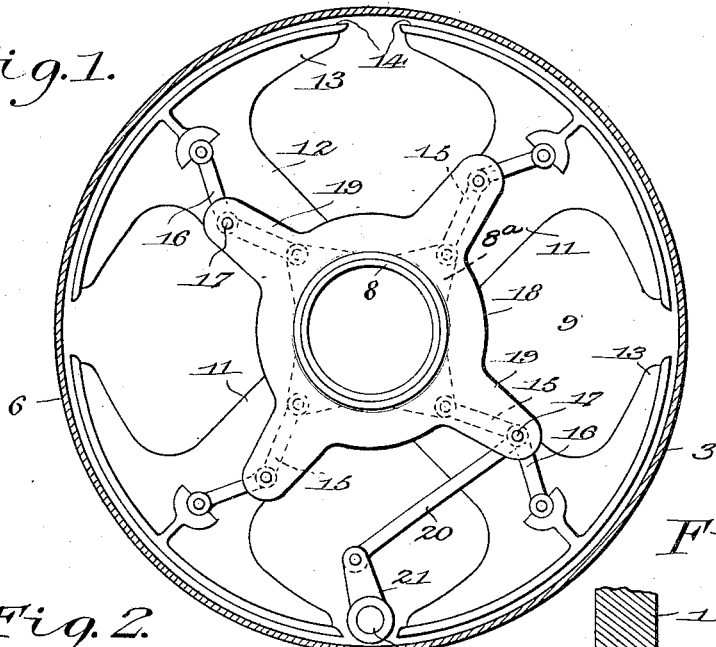
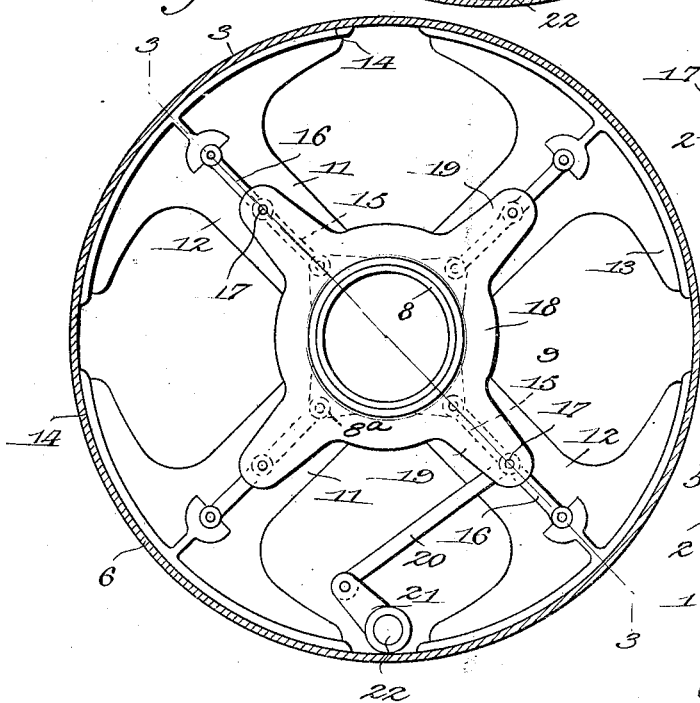
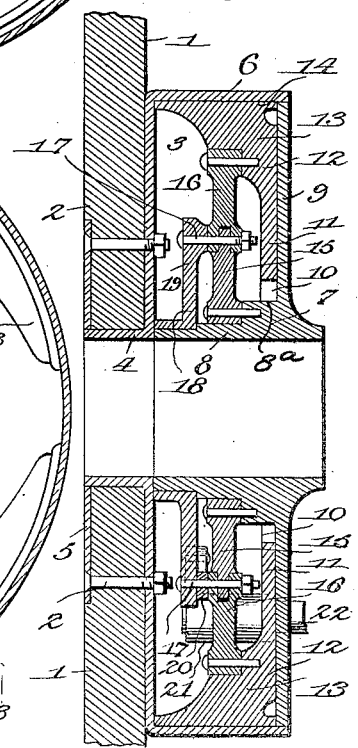
George B. Youngs. INVENTOR
BY Victor J. Evans
ATTORNEY
WITNESS:

UNITED STATES PATENT OFFICE.

GEORGE B. YOUNGS, OF NEW YORK, N. Y.

BRAKE.

1,424,059.  Specification of Letters Patent.  Patented July 25, 1922.

Application filed May 11, 1920. Serial No. 380,458.

*To all whom it may concern:*

Be it known that I, GEORGE B. YOUNGS, a citizen of the United States, residing at New York city, in the county of New York and State of New York, have invented new and useful Improvements in Brakes, of which the following is a specification.

This invention relates to brakes and especially to that type used in automobiles and other vehicles and one of the principal objects is to provide a brake in which the entire braking surfaces of the brake shoes bear upon the brake drum uniformly.

Another object is to provide a brake in which practically the entire inner surface of the drum shall be utilized for braking purposes.

Another object is to provide a brake in which a great and efficient leverage may be obtained.

With these and incidental objects in view, the invention consists in certain novel construction and combination of parts the essential features of which will now be set forth.

All of these objects are accomplished by means of mechanism in the accompanying drawing, in which:—

Figure 1 is a vertical sectional view showing the parts in normal position with the brake released.

Figure 2 is a similar view showing the parts in braking position.

Figure 3 is a horizontal sectional view taken substantially on line 3—3, Figure 2.

Like characters of reference refer to like parts in all views.

This invention contemplates the providing of a brake wherein the brake shoes are arcuate and are moved substantially radially by toggle mechanism into contact with the inner surface of the brake drum in such manner that the entire braking surfaces of the shoes is effective.

Referring more particularly to the drawings, 1 represents the spokes of an automobile wheel, to which is secured by bolts 2, a drum 3 having a hub 4 extending through the hub of the automobile wheel. A plate 5 on the outside of the wheel is also held by said bolts 2. The drum 3 comprises an inwardly opening annular flange 6.

A stationarily mounted member 7 comprising a sleeve 8 and a disk-like flange 9 is provided with radially cut ways 10 formed in the outer face of the disk 9; and in these ways are mounted the shanks 11 of brake-blocks 12. The brake-shoes 13 are preferably formed as part of the brake-block and are arcuate in form and concentric with the drum so that when the blocks slide outwardly, the entire surface of the friction facing 14 may be brought into contact with the inner surface of the flange 6 of the brake-drum.

Pivotally secured at one end to bosses 8ª formed on the sleeve element 8 are links 15 and similarly secured to the brake-blocks 12 are links 16. The free end of each link 15 is pivotally connected to the free end of a respective one of the links 16 to form a toggle-joint by a respective pivot pin 17.

Rotatably secured on the sleeve portion 8 is a spider 18 having radiating elements 19 each of which is secured to a respective one of said pins 17 as shown in Figure 3.

The link 20 has one of its ends pivoted on one of the pivot pins 17 and its other end secured to a rock arm 21 fast on the brake rod 22 which may be operated from the brake pedal in any suitable manner.

An operation of the above described mechanism is as follows:—

The parts are normally in the position shown in Figure 1, and when it is desired to set the brakes, the pedal is depressed (not shown) thereby rocking shaft 22 and arm 21 to move link 20 forward, thereby tending to move the spider clockwise so as to straighten the toggle-joints and force out the brake blocks 12 simultaneously and radially so as to bring the entire surface of the friction facings 14 into equal contact with the inside of flange 6 of the friction drum. Figure 2 shows the extreme position to which the blocks may be moved when the brakes are set and the friction facings have been worn down until nearly ready to be replaced.

While I have described what I consider to be the most desirable embodiment of my invention, it is obvious that many of the details may be varied without in any way departing from the spirit of my invention; and I therefore do not limit myself to the exact details of construction herein set forth nor to anything less than the whole of my invention limited only by the appended claims.

What I claim as new and desire to secure by Letters-Patent is:—

1. In a device of the class described, the combination of a brake drum; a plurality of brake blocks movable radially thereof; a pair of toggle links for each of said blocks, each of said pairs having one link pivoted to the respective block and the other to a stationary part; and a web mounted for rotary movement and connected to each pair of toggle links at their knuckle.

2. In a device of the class described, the combination of a brake drum; a plurality of brake blocks movable radially thereof; a pair of toggle links for each of said blocks, each of said pairs having one link pivoted to the respective block and the other to a stationary part; a web mounted for rotary movement and connected to each pair of toggle links at their knuckle; and means for rotating said web for the purpose set forth.

3. In a device of the class described, the combination of a brake drum mounted for rotation; a member stationarily mounted concentric with said drum and provided with a plurality of bosses; a link pivoted at one end to each of said bosses; a link pivoted to each of the first said links; a brake block secured to each of the second said links; and a spider rotatably mounted on said stationary member and connected to said links at their points of pivotal connection with each other.

4. In a device of the class described, the combination of a brake drum mounted for rotation; a member stationarily mounted concentric with said drum and provided with a plurality of bosses; a link pivoted at one end to each of said bosses; a link pivoted to each of the first said links; a brake block secured to each of the second said links; a spider rotatably mounted on said stationary member and connected to said links at their points of pivotal connection with each other; and means for operating said spider.

In testimony whereof I have affixed my signature.

GEORGE B. YOUNGS.